United States Patent Office 3,544,568
Patented Dec. 1, 1970

3,544,568
3-AMINO-5,6-SUBSTITUTED PYRAZINAMIDES
Edward J. Cragoe, Jr., and John B. Bicking, Lansdale, Pa., assignors to Merck & Co., Inc., Rahway, N.J., a corporation of New Jersey
No Drawing. Continuation-in-part of application Ser. No. 573,447, Aug. 17, 1966. This application Mar. 18, 1969, Ser. No. 808,335
Int. Cl. C07d 87/42
U.S. Cl. 260—247.2            10 Claims

ABSTRACT OF THE DISCLOSURE 3-aminopyrazinamides, optionally having an additional substituent or substituents attached to the pyrazine nucleus and wherein the amide nitrogen carries an amino alkyl substituent, a pyridyl methyl, a 1-loweralkyl-2-pyrrolidinylmethyl or a 1-loweralkyl-3-pyrrolidinylmethyl, are described. The products possess diuretic and/or saluretic properties and are prepared by the reaction of a 3-aminopyrazinoate and a suitably substituted amine or by the reaction of said amine with a 4H-pyrazino-[2,3-d][1,3] oxazin-4-one followed by hydrolysis.

---

This application is a continuation-in-part of our co-pending U.S. patent application, Ser. No. 573,447, filed Aug. 17, 1966, now abandoned.

This invention particularly is concerned with pyrazinamides which can be represented by the following structure:

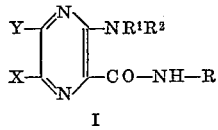

I and pharmaceutically acceptable salts thereof, especially the hydrochloride salts, wherein X represents (a) hydrogen
(b) halogen such as, chloro, bromo, or iodo
(c) trifluoromethyl
(d) lower-alkyl; especially $C_{1-3}$ lower alkyls as methyl, ethyl, propyl and isopropyl;
(e) lower-cycloalkyl, especially those having 3–6 ring carbons as cyclopropyl, cyclopentyl and cyclohexyl;
(f) phenyl or substituted phenyl, advantageously where the substituent is halogen, especially a chloro or bromo substituent;
(g) lower alkylthio and phenyl-lower alkylthio wherein the alkyl moiety advantageously is a 1–3 carbon alkyl as methyl, ethyl, propyl, isopropyl;
(h) lower alkylsulfonyl and phenyl-lower alkylsulfonyl wherein the alkyl moiety advantageously is a 1–3 carbon alkyl as methyl, ethyl, propyl, isopropyl;
(i) lower alkoxy especially $C_{1-3}$ lower alkoxy as methoxy, ethoxy, propoxy, isopropoxy;
(j) $R^3R^4N$ where $R^3$ represents hydrogen and lower alkyl advantageously $C_{1-3}$ lower alkyls as methyl, ethyl, propyl, isopropyl, and $R^4$ represents lower alkyl advantageously $C_{1-3}$ lower alkyls as methyl, ethyl, propyl, isopropyl, and phenyl-lower-alkyl wherein the alkyl moiety advantageously is a 1–3 carbon alkyl as methyl, ethyl, propyl, isopropyl and when $R^3$ and $R^4$ are lower alkyl they may be joined to form with the nitrogen atom to which they are attached a heterocyclic ring such as piperidino, pyrrolidino, etc.

Y represents (a) hydrogen,
(b) hydroxy,
(c) mercapto,
(d) lower alkoxy, especially $C_{1-3}$ lower alkoxy as methoxy, ethoxy, propoxy, isopropoxy,
(e) lower alkylthio wherein the alkyl moiety advantageously is a 1–3 carbon alkyl as methyl, ethyl, propyl, isopropyl,
(f) lower alkyl advantageously $C_{1-3}$ lower alkyls as methyl, ethyl, propyl, isopropyl, or substituted loweralkyl especially trifluoromethyl,
(g) lower-cycloalkyl, especially those having 3–6 ring carbons as cyclopropyl, cyclopentyl, cyclohexyl, and the like
(h) mononuclear aryl, especially phenyl,
(i) amino, advantageously having the structure

wherein $R^5$ represents (1) hydrogen,
(2) amino or mono- or di-lower alkylamino, (advantageously forming a hydrazino group, the alkyl moiety, when present, being a $C_{1-3}$ lower alkyl)
(3) lower alkoxy advantageously having from 1 to 3 carbons as methoxy, ethoxy, propoxy, isopropoxy,
(4) phenyl,
(5) lower alkyl, either straight or branched chain, saturated or unsaturated and containing preferably from 1 to 6 carbon atoms as methyl, ethyl, propyl, isopropyl, butyl, pentyl, hexyl, or any of the branched chain butyl, pentyl or hexyl groups, or cyclic (3- to 6-membered rings) and either unsubstituted or containing one or more substituents such as (a) hydroxyl,
(b) trifluoroalkyl, especially trifluoromethyl,
(c) a cycloalkyl substituent having 3 to 6 carbons in the cycloalkyl structure, as cyclopropyl, cyclobutyl, cyclopentyl, cyclohexyl,
(d) an aryl substituent preferably phenyl or substituted phenyl such as lower-alkylphenyl, the alkyl moiety having 1–3 carbons and halophenyl as chlorophenyl, bromophenyl, fluorophenyl, and the like, or a (e) heterocyclic substituent especially furyl, pyridyl, and

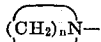

wherein $n$ is one of the numerals 4 through 6, or (f) amino substituent as the unsubstituted amino, or mono- or di-lower-alkyl amino wherein the alkyl groups(e) have 1–3 carbons, (6) acyl such as lower alkanoyl, having from 1 5 carbon atoms; and wherein $R^6$ represents hydrogen and lower alkyl; and when $R^5$ and $R^6$ each represents a lower alkyl, the lower alkyl groups can be linked together to form a cyclic structure with the nitrogen atom to which they are attached, particularly forming a 5- to 8-membered ring, advantageously forming with the nitrogen atom a 1-pyrrolidinyl, piperidino, or hexahydro-1-azepinyl.

R represents (a)

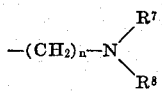

$n$ is the numeral 2 or 3; and wherein $R^7$ and $R^8$ can be similar or dissimilar radicals and respectively represent hydrogen or lower alkyl especially methyl and ethyl, and when $R^7$ and $R^8$ represent a lower alkyl, the lower alkyl groups can be linked together directly, or through a hetero atom, to form a cyclic structure with the nitrogen atom to which they are attached, particularly a 5- to 8-membered ring, advantageously forming a morpholino, 1-pyrrolidinyl, piperidino, hexahydro-1-azepinyl, octahydro-1-azocinyl, 4-alkyl-1-piperazinyl, pyridyl, and the like.

(b) —CH$_2$—R$^9$ where $R^9$ represents a heterocyclic radical such as 2-, 3-, or 4-pyridyl; 1-lower alkyl-2-pyrrolidinyl wherein the lower alkyl advantageously is methyl and ethyl and the like, and (c) 1-lower alkyl-3-pyrrolidinyl wherein the lower alkyl advantageously is methyl and ethyl.

$R^1$ represents hydrogen or lower alkyl;
$R^2$ represents (a) hydrogen, (b) lower alkyl especially those having from 1 to 5 carbon atoms and either straight or branched chain lower alkyls as methyl, ethyl, propyl, isopropyl, butyl, pentyl and the various branched chain butyl and pentyl isomers, as well as substituted lower alkyls particularly wherein the substituent group is a heterocyclic group such a furyl and the like, or a lower alkoxy having 1 to 3 carbons, or di-lower alkylamino wherein each alkyl group has from 1 to 4 carbons or wherein the alkyl groups are linked together either directly or through a hetero atom as O, S or N to form the pyrrolidinyl, piperidino, hexahydro-1-azepinyl, octahydro-1-azocinyl, morpholino, piperazinyl and the like heterocyclic substituent, (c) lower cycloalkyl having advantageously 5 or 6 ring carbons as cyclopentyl and cyclohexyl, (d) aralkyl particularly phenyl-lower alkyl having 1 to 3 carbons in the alkyl moiety and wherein the phenyl moiety can be either unsubstituted or having one or more substituents selected from halogen( especially chloro, bromo, and fluoro), lower alkyl (especially having from 1 to 3 carbons), and/or lower alkoxy (preferably having 1 to 3 carbons), said aralkyl groups being, for example, benzyl, phenethyl, phenylpropyl, 2-phenylpropyl, 2,4-dichlorobenzyl, 4-methoxyphenethyl, 4-methylbenzyl, 4-ethylphenethyl, 3,4,5-trimethylbenzyl and the like, (e) an acyl group advantageously a lower alkanoyl or phenalkanoyl having from 1 to 4 carbons in the alkyl moieties as formyl, acetyl, propionyl, butyryl, benzoyl and the like, and where $R^1$ and $R^2$ are lower alkyl they can be linked together directly to form a 5- or 6-membered azacyclic radical with the nitrogen to which they are attached as the pyrrolidinyl or piperidino radical or they can be linked through oxygen or nitrogen to form a 6-membered heterocyclic radical with the nitrogen to which they are attached to form, for example, the morpholino, piperazinyl, 4-methylpiperazinyl radical and the like.

In some instances it may be desirable to make a salt of these compounds, using a pharmaceutically acceptable acid, such as hydrochloric, hydrobromic, phosphoric, sulfuric, maleic, tartaric, salicyclic, citric and the like, and these salts are to be considered as included in this invention and in the scope of the claims.

The compounds of this invention exhibit diuretic and/or soluretic properties and therefore find use in the treatment of conditions associated with excess fluid retention and/or excess retention of sodium.

The products of this invention can be administered to man or animals in the form of pills, tablets, capsules, elixirs, injectable preparations and the like and can comprise one or more of the compounds of this invention as the only essential active ingredient of the pharmaceutical formulation, or, the novel compound(s) can be combined in pharmaceutical formulations with other therapeutic agents. The compounds of this invention are advantageously administered at a dosage range of from about 5 mg./day to about 750 mg./day or at a somewhat higher or lower dosage at the physician's discretion, preferably in subdivided amounts on a 2 to 4 times a day regimen.

The compounds of this invention can be made by several different processes one of which may be more useful than another for making a specific compound. In the description of the processes that follow, the radicals, X, Y, R, $R^1$ and $R^2$ are as above defined.

One generally useful process can be represented as follows:

Method A

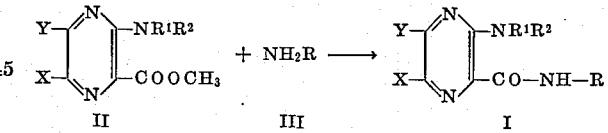

wherein X, Y, R, $R^1$ and $R^2$ are as above defined.

Method A synthesis involves the reaction of a pyrazinoic acid ester of the type illustrated by Compound II with an amine of the type illustrated by Compound III. The methyl ester is shown for illustrative purposes only since the ester may be that of certain other alcohols, especially lower aliphatic alcohols.

The reaction is carried out by mixing the ester and the amine and allowing the mixture to remain at ambient temperatures, or by heating at temperatures up to 100° C., for ten minutes to 4 hours or longer. A solvent such as an alkanol, for example, methanol, may be added, or an excess of the amine may be used as the solvent. The desired reaction product usaully is recovered by diluting with water, and then cooling, if necessary, to precipitate the product, which can be purified by recyrstallization from an appropriate solvent.

The alkyl 3-NR$^1$R$^2$-pyrazinoate Compounds II, except those wherein $R^2$ is an acyl group, used as intermediates in Method A, are readily prepared by the reaction of an alkyl 3-bromopyrazinoate with the selected amine according to the following reaction scheme:

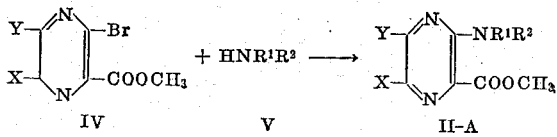

The reaction is carried out at room temperature or with moderate warming and preferably in the presence of a lower alkanol.

The alkyl 3-bromopyrazinoates IV required in the above preparation can be prepared from the corresponding alkyl 3-aminopyrazinoate by adding to a suspension of the alkyl 3-aminopyrazinoate in a mixture of bromine, hydrobromic acid and acetic acid at a temperature of 0°–10° C., an aqueous solution of an alkali nitrite, with stirring. Stirring is continued at a temperature below 0° C. for about ½–2 hours, after which time the excess bromine is destroyed suitably by the addition of an alkali bisulfite. The product usually is recovered by filtration and purified by recrystallization.

The alkyl 3-$R^1R^2N$-pyrazinoate compounds where $R^1R^2N$-is amino, lower-alkylamino or acylamino used as intermediates in Method A also can be prepared by methods described in Belgian Pats. 639,386 and 651,730, the disclosures of which are incorporated herein by reference.

A second method for preparing the pyrazinamides of this invention, particularly those which have a 3-acylamino-substituent, may be represented as follows:

Method B

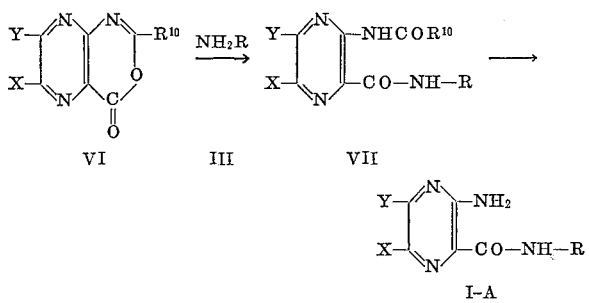

wherein X, Y and R have the meaning above defined, and $R^{10}$ is hydrogen, alkyl or aralkyl.

The reaction of the 4H-pyrazino-[2,3-d][1,3]oxazin-4-one (Compound VI) and $NH_2R$ (Compound III) usually is carried out with equimolecular quantities of the reactants, with or without a solvent. Preferably the solvent is water, or an organic solvent such as alcohol or pyridine. The reaction to form the 3-acylamino-derivative may take place at room temperature, or the application of heat may be required. The reaction usually is complete in less than 30 minutes, although it may be continued for 1 to 3 hours. The product usually crystallizes from the reaction mixture and can be further purified by recrystallization.

The 3-acetamidopyrazinamides (Compound VII) can be hydrolyzed to the corresponding 3-aminopyrazinamides (Compound I-A) by being warmed with dilute aqueous acid, such as hydrochloric, methanesulfonic and the like.

The preparation of the 4H-pyrazino[2,3-d][1,3]oxazin-4-one compounds (VI) is described in Belgian Pats. 639,386, 639,393 and 651,730, the disclosures of which are incorporated herein by reference.

EXAMPLE 1

N-(2-morpholinoethyl)-3-amino-6-bromopyrazinamide

Methyl 3-amino-6-bromopyrazinoate (5.0 g., 0.022 mole) is dissolved in 2-morpholinoethylamine 45 g., 0.35 mole). This solution is warmed on a steam bath for 15 minutes then poured into water (150 ml.) and cooled to 0–5° C. The yellow solid that precipitates is recrystallized from methanol. The pure N-(2-morpholinoethyl)-3-amino-6-bromopyrazinamide obtained is a light yellow solid, M.P. 142–144° C. The yield of N-(2-morpholinoethyl)-3-amino-6-bromopyrazinamide is 4.8 g. (68%).

Analysis.—Calculated for $C_{11}H_{16}BrN_5O_2$ (percent): C, 40.01; H, 4.89; N, 21.21. Found (percent): C, 40.41; H, 4.94; N, 21.14.

EXAMPLE 2

N-[3-(4-methyl-1-piperazinyl)propyl]-3-amino-6-chloropyrazinamide

A mixture of methyl 3-amino-6-chloropyrazinoate (3.76 g., 0.02 mole) and 3-(4-methyl-1-piperazinyl)propylamine (6 ml., 0.04 mole) is heated for 10 minutes on a steam bath. The mixture then is cooled and diluted with water to precipitate the product which is recrystallized from 2-propanol to yield 5.7 g. of N-[3-(4-methyl-1-piperazinyl)propyl]-3-amino-6-chloropyrazinamide, M.P. 178–180.5° C.

Analysis.—Calculated for $C_{13}H_{21}ClN_6O$ (percent): C, 49.91; H, 6.77; N, 26.87. Found (percent): C, 50.07; H, 6.85; N, 26.88.

EXAMPLE 3

N-(2-aminoethyl)-3-amino-6-chloropyrazinamide

A mixture of methyl 3-amino-6-chloropyrazinoate (3.8 g., 0.02 mole), ethylenediamine (4.8 g., 0.08 mole) and 25 ml. of water is stirred for 3 hours at room temperature. The solid product is collected and recrystallized twice from 2-propanol to obtain 0.8 g. of N-(2-aminoethyl)-3-amino-6-chloropyrazinamide, M.P. 153–155° C.

Analysis.—Calculated for $C_7H_{10}ClN_5O$ (percent): C, 38.98; H, 4.67; N, 32.48. Found (percent): C, 39.15; H, 4.68; N, 32.00.

EXAMPLE 4

N-(2-dimethylaminoethyl-3-amino-6-chloropyrazinamide

A mixture of methyl 3-amino-6-chloropyrazinoate (3.8 g., 0.02 mole) and 2-dimethylaminoethylamine (6 ml.) is heated for 2 hours on a steam bath. The mixture then is cooled and diluted with water to precipitate the product which is recrystallized from aqueous ethanol to yield 3.2 g. of N-(2-dimethylaminoethyl)-3-amino-6-chloropyrazinamide, M.P. 94–96° C.

Analysis.—Calculated for $C_9H_{14}ClN_5O$ (percent): C, 44.35; H, 5.79; N, 28.74. Found (percent): C, 44.11; H, 5.26; N, 28.68.

EXAMPLE 5

1-ethyl-2-(3,5-diamino-6-chloropyrazinamidomethyl)pyrrolidine

By replacing the methyl 3-amino-6-chloropyrazinoate and 2-dimethylaminoethylamine of Example 4 by equimolecular quantities of methyl 3,5-diamino-6-chloropyrazinoate and 1-ethyl-2-aminomethylpyrrolidine and following the procedure of Example 4, there is obtained 1-ethyl-2-(3,5-diamino-6-chloropyrazinamidomethyl)pyrrolidine.

EXAMPLE 6

N-(2-dimethylaminoethyl)-3-acetamido-6-chloropyrazinamide 2-methyl-6-chloro-4H-pyrazino[2,3-d][1,3]oxazin-4-one (5.94 g., 0.03 mole) is added to a solution of 2-dimethylaminoethylamine (3.96 g., 0.045 mole) in 75 ml. of water. The product quickly precipitates from the solution initially obtained and is recrystallized from 2-propanol. There is obtained 5.0 g. of N-(2-dimethylaminoethyl)-3-acetamido-6-chloropyrazinamide, M.P. 142–144° C.

Analysis.—Calculated for $C_{11}H_{16}ClN_5O_2$ (percent): C, 46.23; H, 5.65; N, 24.51. Found (percent): C, 46.60; H, 5.69; N, 24.52.

EXAMPLE 7

N-(2-dimethylaminoethyl)-3-amino-6-chloropyrazinamide

N-(2-dimethylaminoethyl)-3-acetamido-6-chloropyrazinamide (3.0 g.) is suspended in water (50 ml.) and dissolved by the addition of methanesulfonic acid (3.0 g.). The solution is heated on a steam bath for 10 minutes, cooled, and basified by the addition of 10% sodium hydroxide solution to obtain N-(2 - dimethylaminoethyl)-3-amino-6-chloropyrazinamide, M.P. 94–96° C.

By replacing the 2-methyl-6-chloro-4H-pyrazino[2,3-][1,3]oxazin-4-one employed in Example 6 by an equimolecular quantity of the following pyrazinooxazinones Example No.
- (8) 2-methyl-6-benzylmercapto-4H-pyrazino [2,3-d][1,3]oxazin-4-one
- (9) 2-methyl-6-methylmercapto-4H-pyrazino [2,3-d][1,3]oxazin-4-one
- (10) 2-methyl-6-methylsulfonyl-4H-pyrazino [2,3-d][1,3]oxazin-4-one
- (11) 2-methyl-6-dimethylamino-4H-pyrazino [2,3-d][1,3]oxazin-4-one
- (12) 2-methyl-6-methoxy-4H-pyrazino [2,3-d][1,3]oxazin-4-one
- (13) 2-methyl-6-piperidino-4H-pyrazino [2,3-d][1,3]oxazin-4-one
- (14) 2-methyl-6-isopropylamino-4H-pyrazino [2,3-d][1,3]oxazin-4-one
- (15) 2-methyl-6-benzylamino-4H-pyrazino [2,3-d][1,3]oxazin-4-one
- (16) 2 - methyl - 6 - benzylsulfonyl - 4H - pyrazino [2,3-d][1,3]oxazin-4-one (prepared by oxidizing 3 - amino - 6 - benzylmercaptopyrazinoic acid in a 2.5% sodium hydroxide solution with an aqueous solution of potassium permanganate and then reacting the product formed with acetic anhydride).

and following the procedure as described in Example 6 there is obtained, respectively:

Example No.
- (8) N-(2-dimethylaminoethyl)-3-acetamido-6-benzylmercaptopyrazinamide
- (9) N-(2-dimethylaminoethyl)-3-acetamido-6-methylmercaptopyrazinamide
- (10) N-(2-dimethylaminoethyl)-3-acetamido-6-methylsulfonylpyrazinamide
- (11) N-(2-dimethylaminoethyl)-3-acetamido-6-dimethylaminopyrazinamide
- (12) N-(2-dimethylaminoethyl)-3-acetamido-6-methoxypyrazinamide
- (13) N-(2-dimethylaminoethyl)-3-acetamido-6-piperidinopyrazinamide
- (14) N-(2-dimethylaminoethyl)-3-acetamido-6-isopropylaminopyrazinamide
- (15) N-(2-dimethylaminoethyl)-3-acetamido-6-benzylaminopyrazinamide
- (16) N(2-dimethylaminoethyl)-3-acetamido-6-benzylsulfonylpyrazinamide Acid hydrolysis of the above 3-acetamido compounds (Examples 8 through 16) by the method described in Example 7 for N-(2-dimethylaminoethyl)-3-acetamido-6-chloropyrazinamide yields Example No.
- (17) N-(2-dimethylaminoethyl)-3-amino-6-benzylmercaptopyrazinamide
- (18) N-(2-dimethylaminoethyl)-3-amino-6-methylmercaptopyrazinamide
- (19) N-(2-dimethylaminoethyl)-3-amino-6-methylsulfonylpyrazinamide
- (20) N-(2-dimethylaminoethyl)-3-amino-6-dimethylaminopyrazinamide
- (21) N-(2-dimethylaminoethyl)-3-amino-6-methoxypyrazinamide
- (22) N-(2-dimethylaminoethyl)-3-amino-6-piperidinopyrazinamide
- (23) N-(2-dimethylaminoethyl)-3-amino-6-isopropylaminopyrazinamide
- (24) N-(2-dimethylaminoethyl)-3-amino-6-benzylaminopyrazinamide
- (25) N-(2-dimethylaminoethyl)-3-amino-6-benzylsulfonylpyrazinamide

EXAMPLE 26

N-(2-diethylaminoethyl)-3-amino-6-chloropyrazinamide

To a solution of methyl 3-amino-6-chloropyrazinoate (9.35 g., 0.05 mole) in dry methanol (250 ml.) is added 2-diethylaminoethylamine (11.6 g., 0.1 mole) and the solution is removed by distillation under vacuum. The residual oil is crystallized from petroleum ether. The yield of N-(2 - diethylaminoethyl) - 3 - chloropyrazinamide is 11.2 g. (83%), M.P. 58–60° C.

Analysis.—Calculated for $C_{11}H_{18}N_5OCl$ (percent): C, 48.70; H, 6.68; N, 25.76. Found (percent): C, 49.13; H, 6.43; N, 25.60.

By replacing methyl 6-chloro-3-aminopyrazinoate employed in Example 26 by an equimolecular quantity of the following esters Example No.
- (27) Methyl 3-amino-5-methylmercapto-6-chloropyrazinoate
- (28) Methyl 3-amino-5-hydroxy-6-chloropyrazinoate
- (29) Methyl 3-amino-5-mercapto-6-chloropyrazinoate
- (30) Methyl 3-amino-5-methylamino-6-chloropyrazinoate
- (31) Methyl 3-amino-5-dimethylamino-6-chloropyrazinoate
- (32) Methyl 3-amino-5-(1-methylhydrazino)-6-chloropyrazinoate
- (33) Methyl 3-amino-5-benzylamino-6-chloropyrazinoate
- (34) Methyl 3-amino-5-pyrrolidino-6-chloropyrazinoate
- (35) Methyl 3-amino-5-allylamino-6-chloropyrazinoate
- (36) Methyl 3-amino-5-(2-hydroxyethylamino)-6-chloropyrazinoate
- (37) Methyl 3-amino-5-anilino-6-chloropyrazinoate
- (38) Methyl 3-amino-5-(2,2,2-trifluoroethylamino)-6-chloropyrazinoate
- (39) Methyl 3-amino-5-(N-methoxy-N-methylamino)-6-chloropyrazinoate
- (40) Methyl 3-amino-5-(2-dimethylaminoethylamino)-6-chloropyrazinoate
- (41) Methyl 3-amino-5-cyclopropylamino-6-chloropyrazinoate
- (42) Methyl 3-amino-6-iodopyrazinoate
- (43) Methyl 3-amino-6-methylpyrazinoate
- (44) Methyl 3-amino-5-methylpyrazinoate
- (45) Methyl 3-amino-5-cyclohexylpyrazinoate
- (46) Methyl 3-amino-6-cyclohexylpyrazinoate
- (47) Methyl 3-amino-5-phenylpyrazinoate
- (48) Methyl 3-amino-6-phenylpyrazinoate
- (49) Methyl 3-amino-6-p-chlorophenylpyrazinoate
- (50) Methyl 3-amino-5-furfurylamino-6-chloropyrazinoate
- (51) Methyl 3-methylamino-6-bromopyrazinoate
- (52) Methyl 3-piperidino-6-bromopyrazinoate
- (53) Methyl 3-dimethylamino-6-bromopyrazinoate
- (54) Methyl 3-(2-dimethylaminoethylamino)-6-bromopyrazinoate
- (55) Methyl 3-amino-5-propargylamino-6-chloropyrazinoate
- (56) Methyl 3-amino-5-ethoxy-6-chloropyrazinoate
- (57) Methyl 3-amino-5-p-chloroanilino-6-chloropyrazinoate
- (58) Methyl 3-amino-5-cyclopropylmethylamino-6-chloropyrazinoate
- (59) Methyl 3-amino-5-p-methylbenzylamino-6-chloropyrazinoate

(60) Methyl 3-amino-5-p-chlorobenzylamino-6-chloropyrazinoate
(61) Methyl 3-amino-5-o-fluorobenzylamino-6-chloropyrazinoate
(62) Methyl 3-amino-5-phenethylamino-6-chloropyrazinoate
(63) Methyl 3-amino-5-(D-glucamino)-6-chloropyrazinoate
(64) Methyl 3-amino-5-(4-methyl-1-piperazinyl)-6-chloropyrazinoate
(65) Methyl 3-amino-5-(hexahydro-1-azepinyl)-6-chloropyrazinoate and carrying out the reaction as described in Example 26 with diethylaminoethylamine there is obtained, respectively:

Example No.
(27) N-(2-diethylaminoethyl)-3-amino-5-methylmercapto-6-chloropyrazinamide
(28) N(2-diethylaminoethyl)-3-amino-5-hydroxy-6-chloropyrazinamide
(29) N-(2-diethylaminoethyl)-3-amino-5-mercapto-6-chloropyrazinamide
(30) N-(2-diethylaminoethyl)-3-amino-5-methylamino-6-chloropyrazinamide
(31) N-(2-diethylaminoethyl)-3-amino-5-dimethylamino-6-chloropyrazinamide
(32) N-(2-diethylaminoethyl)-3-amino-5-(1-methylhydrazino)-6-chloropyrazinamide
(33) N-(2-diethylaminoethyl)-3-amino-5-benzylamino-6-chloropyrazinamide
(34) N-(2-diethylaminoethyl)-3-amino-5-pyrrolidino-6-chloropyrazinamide
(35) N-(2-diethylaminoethyl)-3-amino-5-allylamino-6-chloropyrazinamide
(36) N-(2-diethylaminoethyl)-3-amino-5-(2-hydroxyethylamino)-6-chloropyrazinamide
(37) N-(2-diethylaminoethyl)-3-amino-5-anilino-6-chloropyrazinamide
(38) N-(2-diethylaminoethyl)-3-amino-5-(2,2,2-trifluoroethylamino)-6-chloropyrazinamide
(39) N-(2-diethylaminoethyl)-3-amino-5-(N-methoxy-N-methylamino)-6-chloropyrazinamide
(40) N-(2-diethylaminoethyl)-3-amino-5-(2-dimethylaminoethylamino)-6-chloropyrazinamide
(41) N-(2-diethylaminoethyl)-3-amino-5-cyclopropylamino-6-chloropyrazinamide
(42) N-(2-diethylaminoethyl)-3-amino-6-idopyrazinamide
(43) N-(2-diethylaminoethyl)-3-amino-6-methylpyrazinamide
(44) N-(2-diethylaminoethyl)-3-amino-5-methyl pyrazinamide
(45) N-(2-diethylaminoethyl)-3-amino-5-cyclohexylpyrazinamide
(46) N-(2-diethylaminoethyl)-3-amino-6-cyclohexylpyrazinamide
(47) N-(2-diethylaminoethyl)-3-amino-5-phenylpyrazinamide
(48) N-(2-diethylaminoethyl)-3-amino-6-phenylpyrazinamide
(49) N-(2-diethylaminoethyl)-3-amino-6-p-chlorophenylpyrazinamide
(50) N-(2-diethylaminoethyl)-3-amino-5-furfurylamino-6-chloropyrazinamide
(51) N-(2-diethylaminoethyl)-3-methylamino-6-bromopyrazinamide
(52) N-(2-diethylaminoethyl)-3-piperidino-6-bromopyrazinamide
(53) N-(2-diethylaminoethyl)-3-dimethylamino-6-bromopyrazinamide
(54) N-(2-diethylaminoethyl-3-(2-dimethylaminoethylamino)-6-bromopyrazinamide
(55) N-(2-diethylaminoethyl)-3-amino-5-propargylamino-6-chloropyrazinamide
(56) N-(2-diethylaminoethyl)-3-amino-5-ethoxy-6-chloropyrazinamide
(57) N-(2-diethylaminoethyl)-3-amino-5-p-chloroanilino-6-pyrazinamide
(58) N-(2-diethylaminoethyl)-3-amino-5-cyclopropylmethylamino-6-chloropyrazinamide
(59) N-(2-diethylaminoethyl)-3-amino-5-p-methylbenzylamino-6-chloropyrazinamide
(60) N-(2-diethylaminoethyl)-3-amino-5-p-chlorobenzylamino-6-chloropyrazinamide
(61) N-(2-diethylaminoethyl)-3-amino-5-o-fluorobenzylamino-6-chloropyrazinamide
(62) N-(2-diethylaminoethyl)-3-amino-5-phenethylamino-6-chloropyrazinamide
(63) N-(2-diethylaminoethyl)-3-amino-5-(D-glucaminomethylamino)-6-chloropyrazinamide
(64) N-(2-diethylaminoethyl)-3-amino-5-(4-methyl-1-piperizinyl)-6-chloropyrazinamide
(65) N-(2-diethylaminoethyl)-3-amino-5-hexahydro-1-azepinyl-6-chloropyrazinamide.

EXAMPLE 66

1-methyl-2-(3,5-diamino-6-chloropyrazinamidomethyl)pyrrolidine

By replacing the methyl 3-amino-6-chloropyrazinoate and 2-dimethylaminoethylamine of Example 4 by equimolecular quantities of methyl 3,5-diamino-6-chloropyrazinoate and 1-methyl-2-aminomethylpyrrolidine respectively and then following the procedure described in Example 4, there is obtained 1-methyl-2-(3,5-diamino-6-chloropyrazinamidomethyl)pyrrolidine.

EXAMPLE 67

1-ethyl-3-(3,5-diamino-6-chloropyrazinamido)pyrrolidine

Step A: Preparation of 1-ethyl-3-aminopyrrolidine.—1-ethyl-3-hydroxypyrrolidine (44.19 g., 0.3837 mole) and chloroform (390 cc.) are placed in a three-necked flask fitted with a reflux condenser, addition tube, magnetic stirrer, and a gas inlet tube. The mixture is saturated with hydrochloric acid gas while chilling and stirring in an icebath. With stirring and ice-bath cooling continuing, thionyl chloride (69.1 g., 0.575 mole) is added dropwise over 40 minutes. Stirring and chilling are continued for one hour followed by stirring at room temperature for four hours and refluxing for one hour. The solvent is removed under reduced pressure over a warm water bath to leave a dark semicrystalline mass consisting of 1-ethyl-3-chloropyrrolidine. A small portion of this material is dissolved in ethyl alcohol and treated with alcoholic picric acid. The resulting 1-ethyl-2-chloropyrrolidine picrate is recrystallized to constant M.P. 151–2° C. from benzene and dried in vacuo over phosphorus pentoxide at 100° C. for 2 hours for analyses.

Analysis.—Calculated for $C_{12}H_{15}O_7N_4Cl$ (percent): C, 39.73; H, 4.17; N, 15.45; Cl, 9.78. Found (percent): C, 39.89; H, 4.29; N, 15.16; Cl, 10.05.

The remainder of the dark semicrystalline mass is dissolved in liquid $NH_3$ (250 cc.) in a glass liner and sealed in the autoclave for heating at 100° C. for six hours. When the autoclave has cooled, the ammonia is evaporated and the oily residue dissolved in a minimum of water. The solution is saturated with solid potassium hydroxide while chilling in an ice bath. The mixture is extracted with four portions of ether and the combined extracts dried over solid potassium hydroxide. The ether is evaporated under reduced pressure and the residue distilled at 50° C. at 15 mm. A fraction weighing 43.81 g. is obtained. V.P.C. indicates a major component of 93% which is 1-ethyl-3-aminopyrrolidine and two minor components (6% and 1%). A dipicrate of 1-ethyl-2-aminopyrrolidine is prepared in ethyl alcohol and recrystallized repeatedly from 80% alcohol water, M.P. dec. 256° C. Dried at 110° C. in vacuo over phosphorus pentoxide for two hours for analyses.

*Analysis.*—Calculated for $C_{18}H_{20}O_{14}N_8$ (percent): C, 37.77; H, 3.52; N, 19.58. Found (precent): C, 37.42; H, 3.89; N, 19.36.

Step B: Preparation of 1-ethyl-3-(3,5-diamino-6-chloropyrazinamido)pyrrolidine.—By replacing the methyl 3-amino-6-chloropyrazinoate and 2-dimethylaminoethylamine of Example 4 by equimolecular quantities of methyl 3,5-diamino-6-chloropyrazinoate and 1-ethyl-3-aminopyrrolidine, respectively, and then following the procedure described in Example 4, there is obtained 1-ethyl-3-(3,5-diamino-6-chloropyrazinamido)pyrrolidine.

EXAMPLE 68

1-ethyl-2-(3-amino-5-trifluoromethylpyrazinamidomethyl)pyrrolidine

Step A: Preparation of 3-amino-5-trifluoromethylpyrazinamide and 3-amino-6-trifluoromethylpyrazinamide.— A mixture of 1,1,1-trifluoro-3,3-dibromoacetone (97.8 g., 0.363 mole), sodium acetate trihydrate (98.6 g., 0.725 mole) and 300 ml. of water is heated, with stirring to 100° C. during 20 minutes. After 5 minutes at 100° C. the solution is rapidly chilled to 0° C. and added to a solution of aminomalonamidamidine dihydrochloride (68.5 g., 0.363 mole) in 720 ml. of water at 0° C. The pH of the solution is adjusted to 8-9 by addition of about 140 ml. of concentrated ammonium hydroxide solution and maintained at pH 8–9 during the reaction by additional small portions of the base. The mixture is stirred 20 hours at 25° C. The green solid that precipitates is collected and extracted with two 200 ml. of portions of boiling acetonitrile. The combined extracts are evaporated in vacuo and the residual brown solid recrystallized from acetic acid to yield 20 g. (27%) of yellow crystals of 3-amino-5-trifluoromethylpyrazinamide, M.P. 193-195° C. A sample of this product, recrystallized from acetic acid, melts at 195–196° C.

*Analysis.*—Calculated for $C_6H_5F_3N_4O$ (percent): C, 34.96; H, 2.44; F, 27.65; N, 27.18. Found (percent): C, 35.39; H, 2.71; F, 27.53; N, 27.19.

The acetic acid mother liquor from the recrystallization of 3-amino-5-trifluoromethylpyrazinamide is diluted with water to precipitate 7.1 g. of a light yellow solid, M.P. 211–214° C. Recrystallization from aqueous acetic acid gives 3-amino-6-trifluoromethylpyrazinamide, M.P. 220–221° C.

*Analysis.*—Calculated for $C_6H_5F_3N_4O$ (percent): C, 34.96; H, 2.44; F, 27.65; N, 27.18. Found (percent): C, 35.26; H, 2.75; F, 27.24; N, 26.89.

Step B: Preparation of 3-amino-5-trifluoromethylpyrazinoic acid.—A mixture of 3-amino-5-trifluoromethylpyrazinamide (18.5 g., 0.09 mole) and 5% sodium hydroxide solution (740 ml.) is heated 10 minutes on a steam bath. The resulting solution is chilled and acidified to Congo Red with 6 N hydrochloric acid to precipitate 17.8 g. (95%) of 3-amino-5-trifluoromethylpyrazinoic acid, M.P. 185–186° C. dec.

*Analysis.*—Calculated for $C_6H_4F_3N_3O_2$ (percent): C, 34.79; H, 1.95; N, 20.29. Found (percent): C, 35.10; H, 1.95; N, 20.23.

Step C: Preparation of methyl 3-amino-5-trifluoromethylpyrazinoate.—3-amino-5-trifluoromethylpyrazino acid (20.7 g., 0.1 mole) is stirred at 25° C. with a solution of hydrogen chloride (300 g.) in methanol (1 liter) for 19 hours. The resulting solution is concentrated by vacuum distillation to a volume of about 200 ml. and then poured into water (750 ml.). The aqueous solution is made basic by the addition of solid sodium bicarbonate and the precipitated ester collected and recrystallized from methanol to give a 97% yield of methyl 3-amino-5-trifluoromethylpyrazinoate, M.P. 195.5–196.5° C.

*Analysis*—Calculated for $C_7H_6F_3N_3O_2$ (percent): C, 38.02; H, 2.73; N, 19.00; F, 25.77. Found (percent): C, 38.20; H, 2.64; N, 18.91; F, 25.84.

Step D: Preparation of 1-ethyl-2-(3-amino-5-trifluoromethylpyrazinamidomethyl)pyrrolidine. — By replacing the methyl 3-amino-6-chloropyrazinoate and 2-dimethylaminoethylamine of Example 4 with equimolecular quantities of methyl 3-amino-5-trifluoromethylpyrazinoate and 1-ethyl-2-aminomethylpyrrolidine and carrying out the reaction as described in Example 4 there is obtained 1-ethyl-2 - (3 - amino - 5 - trifluoromethylpyrazinamidomethyl) pyrrolidine.

EXAMPLE 69

1-ethyl-2-(3-amino-6-trifluoromethylpyrazinamidomethyl)pyrrolidine

Step A: Preparation of ethyl 3-amino-6-trifluoromethylpyrazinoate.—A stirred, cold solution of triethyloxonium fluoroborate (20.0 g., 0.105 mole) in ethylene chloride (320 ml.) is treated in one portion with a hot solution of 3-amino-6-trifluoromethylpyrazinamide from Example 68, Step A (2.0 g. 0.0097 mole) in ethylene chloride (350 ml.). After standing 3 hours at room temperature the ethylene chloride is distilled at room temperature and the remaining oil is treated with 5 N potassium carbonate (40 ml.). After 3 minutes, water (50 ml.) is added and the intermediate imino ether is extracted with diethyl ether (3×100 ml.), washed with dilute potassium carbonate solution, water and then extracted into 1 N sulfuric acid (100 ml.). After standing for 3 hours, the product is extracted with diethyl ether, dried over magnesium sulfate and distilled at reduced pressure to give 259 mg. of ethyl 3-amino-6-trifluoromethylpyrazinoate which melts at 91.5–93.5° C. after two recrystallizations from hexane (5 ml.).

*Analysis.*—Calculated for $C_8H_8F_3N_3O_2$ (percent): C, 40.86%; H, 3.43; N, 17.87. Found (percent): C, 41.51; H, 3.87; N, 17.45.

Step B: Preparation of 1-ethyl-2-(3-amino-6-trifluoromethylpyrazinamidomethyl)pyrrolidine. — By replacing the methyl 3-amino-6-chloropyrazinoate and 2-dimethylaminoethylamine of Example 4 with equimolecular quantities of ethyl 3-amino-6-trifluoromethylpyrazinoate and 1-ethyl-2-aminomethylpyrrolidine and carrying out the reaction as described in Example 4 there is obtained 1-ethyl - 2 - (3-amino-6-trifluoromethylpyrazinamidomethyl)pyrrolidine.

EXAMPLE 70

N-(2-methylaminoethyl)-3-benzylamino-6-chloropyrazinamide

Step A: Preparation of methyl 3-benzylamino-6-chloropyrazinoate.—To a stirred solution of methyl 3-bromo-6-chloropyrazinoate (2.5 g., 0.01 mole) in dimethyl sulfoxide (20 ml.) is added benzylamine (2.1 g., 0.02 mole). The reaction mixture is allowed to stand at room temperature for two hours and then is poured into water (100 ml.) whereupon a solid separates that is recovered by filtration and dried to yield 2.6 g. (94%) of methyl 3-benzylamine-6-chloropyrazinoate, M.P. 135–137° C.

Step B: Preparation of N-(2-methylaminoethyl)-3-benzylamino-6-chloropyrazinamide.—By replacing the methyl 3-amino-6-chloropyrazinoate and 2-dimethylaminoethylamine of Example 4 by equimolecular quantities of methyl 3-benzylamino-6-chloropyrazinoate and 2-methylaminoethylamine respectively, and then following substantially the same procedure described in Example 4, there is obtained N-(2-methylaminoethyl)-3-benzylamino-6-chloropyrazinamide.

EXAMPLE 71

N-[2-(1-pyrrolidinyl)ethyl]-3-p-chlorobenzylamino-6-chloropyrazinamide

Step A: Preparation of methyl 3-p-chlorobenzylamino-6-chloropyrazinoate.—To a stirred solution of methyl 3-bromo-6-chloropyrazinoate (2.5 g., 0.01 mole) in dimethyl sulfoxide (25 ml.) is added p-chlorobenzylamine (2.8 g., 0.02 mole), the reaction mixture is allowed to stand at room temperature for 18 hours and then is poured into water (100 ml.) and the solid that separates is recovered by filtration and dried to yield 2.1 g. (67%) of methyl 3-p-chlorobenzylamino-6-chloropyrazinoate, M.P. 150–152° C. After crystallization from ethanol the product melts at 152–154° C.

Step B: Preparation of N-[2-(1-pyrrolidinyl)ethyl]-3-p-chlorobenzylamino - 6-chloropyrazinamide.—By replacing the methyl 3-amino-6-chloropyrazinoate and 2-dimethylaminoethylamine of Example 4 by equimolecular quantities of methyl 3-p-chlorobenzylamino-6-chloropyrazinoate and 2-(1-pyrrolidinyl)ethylamine respectively, and following substantially the same procedure described in Example 4, there is obtained N-[2-(1-pyrrolidinyl)ethyl]-3-p-chlorobenzylamino-6-chloropyrazinamide.

EXAMPLE 72

N-(2-piperidinoethyl)-3-p-methoxybenzylamino-6-chloropyrazinamide

Step A: Preparation of methyl 3-p-methoxybenzylamino-6-chloropyrazinoate.—To a stirred solution of methyl 3-bromo-6-chloropyrazinoate (2.5 g., 0.01 mole) in dimethyl sulfoxide (20 ml.) is added p-methoxybenzylamine (2.74 g., 0.02 mole). The reaction mixture is allowed to stand at room temperature for 2.5 hours and then is poured into water (100 ml.). The solid that separates is recovered by filtration and dried to yield 3.0 g. (100%) of methyl 3-p-methoxybenzylamino-6-chloropyrazinoate, M.P. 100–105° C. After crystallization from ethanol the product melts at 105–106° C.

Step B: Preparation of N-(2-piperidinoethyl)-3-p-methoxybenzylamino-6-chloropyrazinamide.—By replacing the methyl 3-amino-6-chloropyrazinoate and 2-dimethylaminoethylamine of Example 4 by equimolecular quantities of methyl 3-p-methylbenzylamino-6-chloropyrazinoate and 2-(1-piperidyl)ethylamine respectively, and then following substantially the same procedure described in Example 4, there is obtained N-(2-piperidino)ethyl-3-p-methoxybenzylamino-6-chloropyrazinamide.

EXAMPLE 73

N-(2-diethylaminoethyl)-3-(2-furfurylamino)-6-chloropyrazinamide

Step A: Preparation of methyl 3-(2-furfurylamino)-6-chloropyrazinoate.—To a stirred solution by methyl 3-bromo-6-chloropyrazinoate (2.5 g., 0.01 mole) in dimethyl sulfoxide (20 ml.) is added furfurylamine (1.94 g., 0.02 mole). The reaction mixture is allowed to stand at room temperature for 20 hours, and then is poured into water (100 ml.). The solid that separates is recovered by filtration and dried. After recrystallization from ethanol there is obtained 1.6 g. (60%) of methyl 3-(2-furfurylamino)-6-chloropyrazinoate, M.P. 109–111° C.

Step B: Preparation of N - (2 - diethylaminoethyl)-3 - (2 - furfurylamino) - 6 - chloropyrazinamide.—By replacing the methyl 3 - amino - 6 - chloropyrazinoate and 2-dimethylaminoethylamine of Example 4 with equimolecular quantities of methyl 3 - (2 - furfurylamino)-6-chloropyrazinoate and 2-diethylaminoethylamine respectively, and then following substatnially the same procedure described in Example 4, there is obtained N - (2-diethylaminoethyl) - 3 - (2 - furfurylamino) - 6 - chloropyrazinamide.

EXAMPLE 74

N-[2-(octahydro-1-azocinyl)ethyl]-3-(2-methoxyethylamino)-5-ethylamino-6-chloropyrazinamide Step A: Preparation of methyl 3 - bromo - 5 - ethylamino - 6 - chloropyrazinoate.—To a stirred suspension of methyl 3 - amino - 5 - ethylamino - 6 - chloropyrazinoate (23.0 g., 0.10 mole) in a mixture of 48% hydrobromic acid (130 ml.) and acetic acid (230 ml.), maintained at 0–5° C. in an ice-bath, is added a solution of bromine (17 ml.) in acetic acid (30 ml.). This is followed by the slow addition of a solution of sodium nitrite (19.5 g., 0.28 mole) in water (35 ml.) and then the reaction mixture is stirred for an additional 1.5 hours at 5–10° C. The excess bromine is decomposed by the addition of a solution of sodium bisulfite (52 g.) in water (170 ml.) and the solid that separates is collected and dried yielding 17.8 g. (60%) of methyl 3-bromo-5-ethylamino - 6 - chloropyrazinoate, M.P. 157–160° C. After crystallization from benzene the product melts at 160–162° C.

Step B: Preparation of methyl 3 - (2 - methoxyethylamino) - 5 - ethylamino - 6 - chloropyrazinoate.—To a stirred solution of methyl 3 - bromo - 5 - ethylamino-6-chloropyrazinoate (15 g., 0.051 mole) in dimethyl sulfoxide (35 ml.) is added methoxyethylamine (9.1 g., 0.12 mole). The reaction mixture is heated on the steam bath for 2 hours, and then is poured into water (200 ml.). The solid that separates is recovered by filtration and dried to yield 11.0 g. (78%) of methyl 3 - (2 - methoxyethylamino) - 5 - ethylamino - 6 - chloropyrazinoate, M.P. 80–83° C. After crystallization from hexane the product melts at 89–90° C.

Step C: Preparation of N - [2 - (octahydro - 1 - azocinyl)ethyl] - 3 - (2 - methoxyethylamino) - 5 - ethylamino - 6 - chloropyrazinamide.—By replacing the methyl 3 - amino - 6 - chloropyrazinoate and 2-dimethylaminoethylamine of Example 4 with equimolecular quantities of methyl 3 - (2 - methoxyethylamino) - 5 - ethylamino-6 - chloropyrazinoate and 2 - (octahydro - 1 - azocinyl) ethylamine respectively, and then following substantially the same procedure described in Example 4, there is obtained N - [2 - octahydro - 1 - azocinyl)ethyl] - 3 - (2-methoxyethylamino) - 5 - ethylamino - 6 - chloropyrazinamide.

EXAMPLE 75

N-(4-pyridylmethyl)-3-amino-6-chloropyrazinamide

By replacing the 2-dimethylaminoethylamine of Example 4 by an equimolecular quantity of (4-pyridylmethyl)-amine and then following substantially the same procedure described in Example 4, there is obtained N - (4 - pyridylmethyl) - 3 - amino - 6 - chloropyrazinamide, M.P. 157.5–159.5° C.

EXAMPLE 76

N-[2-(2-imidazolin-2-ylamino)ethyl]-3-amino-6-chloropyrazinecarboxamide hydriodide A solution of N - (2 - aminoethyl) - 3 - amino-6-chloropyrazinecarboxamide (6.5 g., 0.03 mole), prepared as described in Example 3, and 2 - methylthio- 2 - imidazoline hydriodide (7.3 g., 0.03 mole) in 100 ml. of ethanol is boiled under reflux for 2 hours. The solution is cooled and diluted with ethyl acetate to cause the product to crystallize. The product is recrystallized from isopropyl alcohol to obtain 2.5 g. (19%) of N-[2-(2-imidazolin - 2 - ylamino)ethyl] - 3 - amino - 6 - chloropyrazinecarboxamide hydriodide, M.P. 181.5–185.5° C.

Analysis.—Calculated for $C_{10}H_{14}ClN_7O \cdot HI$ (percent): C, 29.17; H, 3.67; N, 23.82. Found (percent): C, 29.45; H, 3.55; N, 23.51.

Additional products that can be prepared by substantially the same procedure described in Example 4 are prepared by replacing the pyrazinoate and amine reactants employed in Example 4 by equivalent quantities of the ester and amine identified in Table I and refluxing the reactants in methyl Cellosolve. The products formed then are separated as described in Example 4.

TABLE I

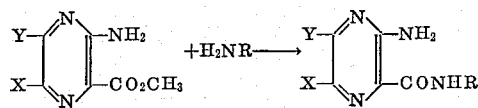

| Ex. No. | X | Y | R | Empirical formula | M.P., °C | C Calcd. | C Found | H Calcd. | H Found | N Calcd. | N Found |
|---|---|---|---|---|---|---|---|---|---|---|---|
| 77 | Cl | H | —(CH₂)₃—N⌒N—CH₃ | C₁₃H₂₁ClN₆O | 179.5-182 | 49.91 | 50.07 | 6.77 | 6.85 | 26.87 | 26.88 |
| 78 | C₆H₅— | CH₃ | —(CH₂)₂—N⌒O | C₁₈H₂₃N₅O₂ | 121.5-123 | 63.32 | 63.62 | 6.79 | 6.65 | 20.52 | 20.46 |
| 79 | CH₃ | C₆H₅— | Same as above | C₁₈H₂₃N₅O₂ | 168-170 | 32.32 | 63.51 | 6.79 | 6.88 | 20.52 | 20.70 |
| 80 | Cl | NH₂ | —(CH₂)₂-pyridyl | C₁₂H₁₃ClN₆O | 193-196 | 49.23 | 49.48 | 4.48 | 4.38 | 28.71 | 29.01 |
| 81 | Cl | NH₂ | —CH₂-pyridyl | C₁₁H₁₁ClN₆O | 241-243 | 47.40 | 47.16 | 3.98 | 3.68 | 30.16 | 30.06 |
| 82 | Cl | NH₂ | —CH₂-pyridyl | Same as above | 208-210 | 47.40 | 47.59 | 3.98 | 3.71 | 30.16 | 30.36 |
| 83 | Cl | NH₂ | —CH₂-pyridyl | ...do... | >210 dec. | 47.40 | 47.58 | 3.98 | 4.06 | 30.16 | 30.16 |
| 84 | Cl | NH₂ | —(CH₂)₂—N⌒N (methylimidazolyl) | C₁₁H₁₆ClN₇O | 184-194 | 44.37 | 44.60 | 5.42 | 5.50 | 32.93 | 32.49 |
| 85 | Cl | NH₂ | —(CH₂)₃—N⌒O | C₁₁H₁₇ClN₆O₂ | 178-179 | 43.93 | 44.22 | 5.70 | 5.68 | 27.95 | 27.84 |

What is claimed is:

1. A 3-aminopyrazinamide having the structure

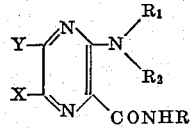

and pharmaceutically acceptable salts thereof wherein X is selected from the group consisting of hydrogen, chloro, bromo, iodo, trifluoromethyl, $C_{1-3}$ alkyl, $C_{3-6}$ cycloalkyl, phenyl, chlorophenyl, bromophenyl, phenyl-$C_{1-3}$ alkyl, $C_{1-3}$ alkylthio, phenyl-$C_{1-3}$ alkylthio, $C_{1-3}$ alkylsulfonyl, phenyl-$C_{1-3}$ alkylsulfonyl, $C_{1-3}$ alkoxy, $C_{1-3}$ alkylamino, di-$C_{1-3}$ alkylamino, phenyl-$C_{1-3}$ alkylamino, piperidino and 1-pyrrolidinyl;
Y is selected from the group consisting of hydrogen, hydroxy, mercapto, $C_{1-3}$ alkoxy, $C_{1-3}$ alkylthio, $C_{1-3}$ alkyl, trifluoromethyl, $C_{3-6}$ cycloalkyl, phenyl, 1-pyrrolidinyl, hexahydro-1-azepinyl, 4-methyl-1-piperazinyl, and —NR⁵R⁶ wherein R⁶ is selected from hydrogen and $C_{1-6}$ alkyl and R⁵ is selected from hydrogen, amino, $C_{1-3}$ alkoxy, phenyl, halophenyl, $C_{1-6}$ alkyl, $C_{2-6}$ monoalkenyl, $C_{2-6}$ monoalkynyl, $C_{3-6}$ cycloalkyl, $C_{3-6}$ cycloalkyl-$C_{1-6}$ alkyl, hydroxy-$C_{1-6}$ alkyl, halo-$C_{1-6}$ alkyl, di-$C_{1-3}$ alkylamino-$C_{1-6}$ alkyl, phenyl-$C_{1-6}$ alkyl, halophenyl-$C_{3-6}$ alkyl, $C_{1-3}$ alkylphen-$C_{1-6}$ alkyl, and furyl-$C_{1-6}$ alkyl;
R¹ is selected from hydrogen and $C_{1-5}$ alkyl;
R is selected from the group consisting of aminoethyl, $C_{1-2}$ alkylaminoethyl, di-$C_{1-2}$ alkylaminoethyl, morpholinoethyl, pyrrolidin-1-ylethyl, piperidinoethyl, octahydro-1-azocinylethyl, 4-lower-alkyl-1-piperazinylpropyl, pyridylmethyl, pyridylethyl, 1-loweralkyl-2-pyrrolidinylmethyl and 1-lower alkyl-3-pyrrolidinyl;
R¹ is selected from hydrogen and $C_{1-5}$ alkyl;
R² is selected from the group consisting of hydrogen, $C_{1-5}$ alkyl, $C_{1-3}$ alkoxy-$C_{1-5}$ alkyl, di-$C_{1-4}$ alkylamino-$C_{1-5}$ alkyl, furyl-$C_{1-5}$ alkyl, phenyl-$C_{1-5}$ alkyl, halophenyl-$C_{1-5}$ alkyl, $C_{1-3}$ alkylphenyl-$C_{1-5}$ alkyl, $C_{1-3}$ alkoxyphenyl, $C_{1-5}$ alkyl, $C_{1-4}$ alkanoyl and phenyl-$C_{1-4}$ alkanoyl; and when R¹ and R² together with the nitrogen to which they are attached form the 1-pyrrolidinyl, piperidino, morpholino, 1-piperazinyl or 4-methyl-1-piperazinyl radical.

2. N-[2-(di-loweralkylamino)ethyl]-3,5-diamino-6-chloropyrazinamide.

3. N-[2-(2-di-loweralkylamino)ethyl]-3-amino-6-halopyrazinamide wherein halo is selected from chloro and bromo.

4. N-[2-(2-dimethylamino)ethyl]-3-amino-6-chloropyrazinamide.

5. N-[2-(2-diethylamino)ethyl]-3-amino-6-chloropyrazinamide.

6. N-(2-aminoethyl)-3-amino-6-chloropyrazinamide.

7. A pyrazinamide as claimed in claim 1, wherein R is pyridylmethyl, R¹ and R² are each hydrogen, Y is selected from hydrogen, amino and trifluoromethyl, and X is selected from hydrogen, chloro and bromo.

8. A pyrazinamide as claimed in claim 7 wherein Y is selected from hydrogen and amino, and X is chloro.

9. A pyrazinamide as claimed in claim 1, wherein R is morpholinoethyl, $R^1$ and $R^2$ are each hydrogen, X is selected from chloro, bromo, lower alkyl and phenyl and Y is selected from hydrogen, amino, lower alkyl and phenyl.

10. A pyrazinamide as claimed in claim 9 wherein X is phenyl and Y is methyl.

No references cited.

ALEX MAZEL, Primary Examiner

JOSE TOVAR, Assistant Examiner

U.S. Cl. X.R.

260—247, 250; 424—248, 250

UNITED STATES PATENT OFFICE
CERTIFICATE OF CORRECTION

Patent No. 3,544,568          Dated December 1, 1970

Inventor(s) Edward J. Cragoe, Jr. and John B. Bicking

It is certified that error appears in the above-identified patent and that said Letters Patent are hereby corrected as shown below:

In column 3, line 10, change "groups(e)" to read ---group(s)---. In column 4, line 72, correct structure IV appear as follows:

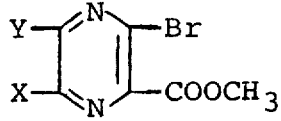

In column 6, line 29, immediately following "dimethylaminoet add a closing parenthesis ---)---. In column 7, line 3, imm iately following "[2,3-" add ---d---. In column 8, line 10, immediately following "diethylaminoethyl)-3-" add --- amino- In column 11, line 64, change "zino acid" to read ---zinoic acid---. In column 12, line 18, change "320 ml." to read --- 350 ml.---; line 58, change "3-benzylamine" to read ---3-benzylamino---. In column 13, line 39, change "3-p-met benzylamino" to read ---3-p-methoxybenzylamino---. In colum line 37, immediately preceding the word "octahydro" add an openin parenthesis ---(---. In Table I, Example 79, under the "C Calcd." column, change "32.32" to read ---63.32---. In colu 15, line 73, change "halophenyl-$C_{3-6}$ alkyl" to read ---halophenyl-$C_{1-6}$ alkyl---; line 75, delete the entire line In column 16, line 64 of Claim 3, change "N-[2-(2-di-" to re --- N-[2-(di- ---, Signed and sealed this 4th day of January 1972.

(SEAL)
Attest:

EDWARD M.FLETCHER,JR.      ROBERT GOTTSCHALK
Attesting Officer            Acting Commissioner of Patents